United States Patent [19]

Beyer et al.

[11] 4,355,068

[45] Oct. 19, 1982

[54] IMPREGNATED GASKET AND METHOD OF PRODUCING

[75] Inventors: Horst Beyer; Hans-Reiner Zerfass, both of Burscheid, Fed. Rep. of Germany

[73] Assignee: Goetze AG, Burscheid, Fed. Rep. of Germany

[21] Appl. No.: 321,202

[22] Filed: Nov. 13, 1981

[30] Foreign Application Priority Data

Nov. 14, 1980 [DE] Fed. Rep. of Germany ....... 3042912

[51] Int. Cl.$^3$ ............................................ B32B 27/00
[52] U.S. Cl. ............................... 428/290; 277/235 B; 427/393.6; 427/443.2; 428/304.4; 428/443; 428/444; 428/537

[58] Field of Search .............. 277/235 B; 428/74, 280, 428/289, 290, 443, 304.4, 444, 445, 449, 452, 537; 427/393.6, 443.2

[56] References Cited

U.S. PATENT DOCUMENTS 3,970,322  7/1976  Stecher et al. .................. 277/235 B
4,201,804  5/1980  Stecher et al. .................. 277/235 B Primary Examiner—James J. Bell
Attorney, Agent, or Firm—Spencer & Kaye

[57] ABSTRACT

In a gasket made of a fibrous and/or porous material impregnated with a polymerizable saturating agent which is partially polymerized only to a plastically deformable consistency, an additive which prevents complete polymerization and hardening is applied to the surfaces of the gasket after impregnation with the saturating agent and partial polymerization.

9 Claims, 1 Drawing Figure

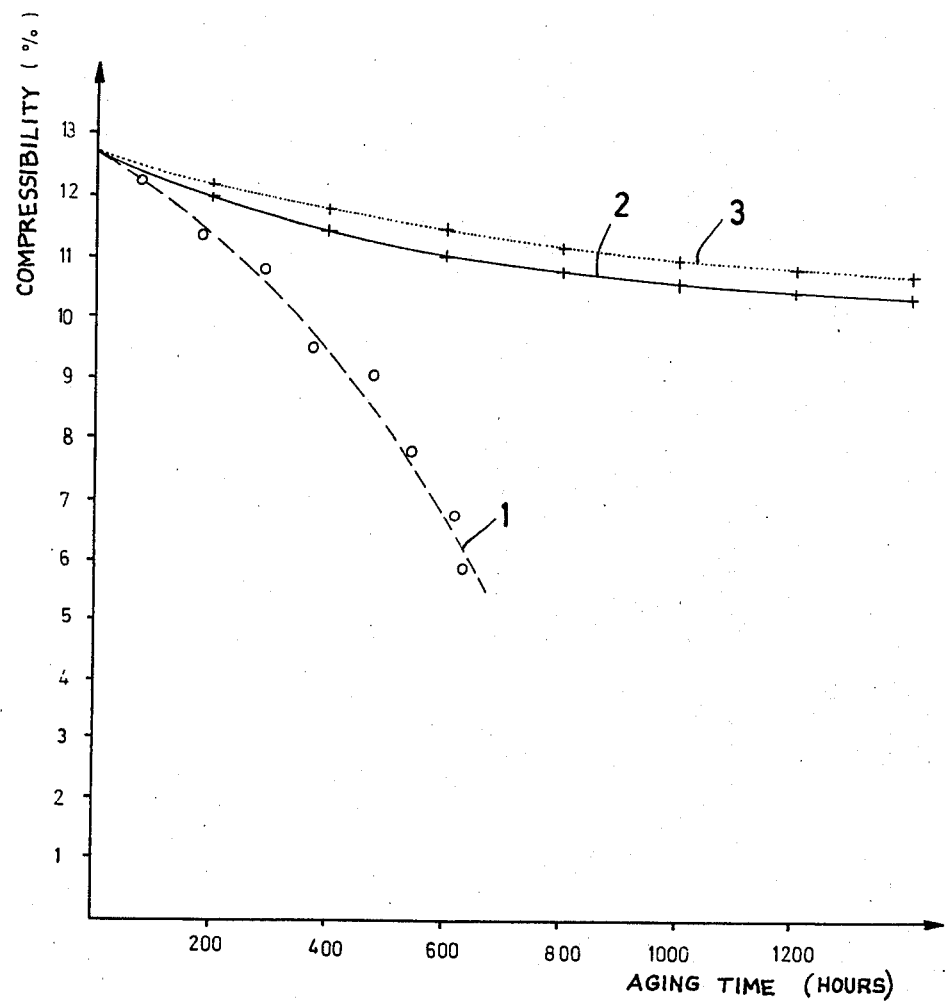

IMPREGNATED GASKET AND METHOD OF PRODUCING

BACKGROUND OF THE INVENTION

The present invention relates to an impregnated flat seal made of an impregnable material, particularly an impregnated cylinder head gasket made of an asbestos fiber fabric, which may be metal reinforced, wherein the saturating agent is only partially hardened until it reaches a still plastically deformable consistency.

Cylinder head gaskets such as those disclosed in U.S. Pat. No. 4,201,804 are saturated with hardenable saturating agents to improve their operating characteristics. In order for these gaskets to be able to adapt themselves, when installed, to the unevennesses of the sealing faces of the associated cylinder head and engine block when under sealing pressure, the hardening of the impregnating agent is stopped when it reaches a still plastically deformable consistency, i.e. the impregnating agent is only partially polymerized. In the installed state, under the operating heat of the engine, the impregnating agent undergoes its final hardening so that the gasket will then attain its full functioning capability.

In practice it is customary to attain the desired degree of partial hardening by means of additives known from the plastics or rubber art which are added to the impregnating agents. This is done either by a preliminary impregnation of the soft material plates with solutions of the additives, or these substances are added directly to the impregnating agents. For example, the polymerizable and cross-linkable liquid saturating agents disclosed in U.S. Pat. No. 4,201,804 receive additions of aging protectants whose concentration causes the polymerization process to be stopped at the desired points by way of a chain breakoff reaction, to thus arrive at the desired degree of partial polymerization. Due to their good plastic adaptability, the gaskets produced in this way have been found to be excellent when used in mass-produced engines.

The use of these gaskets as replacement parts for repairs is fraught with problems, however. It has been found that the saturating agent slowly hardens during storage periods customary for the use of the gaskets as replacement parts, so that the gaskets, when stored over a long period of time in a repair facility, may gradually lose their plastic adaptability to the unevennesses of the sealing faces of the cylinder head and engine block in which they will be installed. It has been attempted to overcome this drawback by the addition of larger quantities of the additives which stop the polymerization process. However, these measures were not successful and, in principle, they even brought about poorer results since the larger quantities of additives again unfavorably influenced the strength characteristics of the hardened saturating agents.

SUMMARY OF THE INVENTION

It is therefore an object of the present invention to improve such impregnated flat seal of impregnable material, such as an impregnated cylinder head gasket made of a possibly metal reinforced asbestos fiber fabric in particular, in such a manner that even if it is stored over long periods of time it will retain its necessary plastic adaptability.

The above and other objects are achieved, according to the present invention, in that after impregnating and partial polymerization, the gasket is treated with an additive which prevents further polymerization and hardening. Preferably, this is done by subsequent impregnation of the gasket with a solution of the additive after the first impregnation and partial polymerization, so that, after the subsequent evaporation of the solvents, the free pores of the gasket are enriched with the subsequently impregnated additive. In some cases a thin coating may be formed over the sealing face at the same time.

In principle, however, it is sufficient if the sealing faces are dusted with the additive on one or both sides. This may be done, if necessary, with the simultaneous use of substances, such as wax or silicone rubber, which serve as binders. Mixtures containing the additives are then applied to the sealing faces in a conventional process for this purpose and are preferably thermally bonded thereto. However, it is also possible, within the scope of the invention, to cover the gasket, before packaging, on one or both sides with a carrier plate, preferably of paper or cardboard, which has been saturated with additives. Airtight packaging which may, if necessary, be effected in vacuo or under a protective gas atmosphere provides additional protection. The person skilled in the art is here free to use, depending on the particular application, one or a plurality of these protective measures, alone or in combination. Preferably, cross-linkable, or polymerizable, organic substances of cis-polybutadiene are used as the saturating agent. In that case, the additives which slow down the polymerization reaction are aging protectants known from the plastics and rubber art.

Gaskets produced in this manner have been tested by storage in hot air at 70° C. and the changes in their compressibility monitored over a long period of time. In comparative tests, the change in compressibility was determined relative to conventional gaskets which had been saturated only with saturating agents containing aging protectants and which were stored under the same conditions. Surprisingly it was found from these tests that the compressibility of the gaskets subsequently treated according to the present invention remained constant over a long period of time or decreased only slightly while the compressibility of the untreated gaskets decreased already after a shorter period of time. It has also been found that when the saturating agent is one of the liquid polybutadienes which are preferably used for the impregnation and which polymerize by linking together the double bonds of the carbon atoms, all commercially available aging protectants are suitable as agents for the subsequent treatment.

BRIEF DESCRIPTION OF THE DRAWING

The FIGURE is a performance diagram illustrating the improvement achieved by the invention.

DESCRIPTION OF THE PREFERRED EMBODIMENTS

The invention will be described in greater detail with the aid of an example and with reference to the diagram appearing in the FIGURE.

The basis for the example is the soft cylinder head gasket disclosed in U.S. Pat. No. 4,201,804, a metal reinforced asbestos fiber plate which was impregnated with a mixture of liquid polybutadiene (molecular weight 1500) with the customary additives in the form of aging protectants and polymerization agents until the pores had been filled to 80% of capacity. After partial thermal polymerization to the desired still plastically deformable state, 10 gaskets each were treated by impregnation with a 10% solution in trichloroethane, of a respective one of 1. N-isopropyl-N'-phenyl-p-phenylene diamine and
2. 2,6-di-tert. butyl-p-kresol, these being constituted by the aging protectants 4010 NA and KB, respectively, commercial products of Bayer AG. After these gaskets had dried, their compressibility was measured according to ASTM F 36-66, Method A, in hot air aging up to 70° C. and storage up to 1500 hours, and compared with the compressibility of 10 untreated gaskets. The diagram in the FIGURE shows the changes in compressibility as an average of 10 measurements in dependence on time. Curve 1 shows the compressibility of a conventional untreated gasket, curves 2 and 3 show the compressibilities of the gaskets treated with the aging protectants 4010 NA and KB, respectively. While the untreated gaskets exhibited a great decline in compressibility already after a short period of time so that after 600 hours of storage their values were no longer monitored, the drop in compressibility of the treated gaskets represented by curves 2 and 3 was so low that even after 1500 hours they were still suitable without restrictions for installation in engines.

Instead of the above mentioned aging protectants there can be used other commercially available aging protectants, preferably based on phenolic or animic compounds such as N(dimethylbuthyl)-N'-phenyl-p-phenylenediamine
2,2,4 trimethylbuthyl-1,2-dihydro-6-ethoxychinoline
2,2' methylene-bis (4-methyl-6-tert-buthylphenol)
4,4' dihydrooxydiphenyl which are known as aging protectants 4020, EC, DK and DOD respectively, commercial products of Bayer AG. The concentrations of the additives in the completed gaskets are preferably between 1 and 8%. When coatings are applied their thickness is preferably between 1 and 50μ, and they consist preferably of commercially available silicon resins which contain preferably between 5 and 20% by weight of the above mentioned aging protectants.

When covering plates are used they consist preferably of paper or cardboard sheets which contain between 3 and 10% by weight of the above aging protectants. The agents are incorporated in the plates preferably by impregnation and if necessary the plates are treated with stickness preventing agents after impregnation and drying.

It will be understood that the above description of the present invention is susceptible to various modifications, changes and adaptations, and the same are intended to be comprehended within the meaning and range of equivalents of the appended claims.

What is claimed is:

1. In a gasket made of a fibrous and/or porous material impregnated with a polymerizable saturating agent which is partially polymerized only to a plastically deformable consistency, the improvement comprising an additive which prevents complete polymerization and hardening applied to the surfaces of said material after impregnation with said saturation agent and partial polymerization.

2. Gasket as defined in claim 1 wherein said material is a metal reinforced asbestos fiber plate.

3. Gasket as defined in claim 1 or 2 wherein said gasket is a cylinder head gasket.

4. In a method for producing a gasket composed of a plate of a fibrous and/or porous material, which method includes impregnating the plate with a polymerizable liquid saturating agent and partially polymerizing the agent to a plastically deformable consistency, the improvement comprising, after said steps of impregnating and partially polymerizing, applying to the surfaces of said plate an additive which prevents premature complete polymerization and hardening of said saturating agent.

5. Method as defined in claim 4 wherein said step of applying comprises impregnating the gasket plate with a solution of the additive.

6. Method as defined in claim 4 wherein said step of applying comprises covering at least one side of the plate with a coating layer of a carrier material which has been saturated with the additive.

7. Method as defined in claim 4 wherein said step of applying comprises covering at least one side of the plate with a cover layer containing large amounts of the additive.

8. Method as defined in claim 4, 6 or 7 wherein the layer containing the additive can be removed before installation.

9. Method as defined in claim 4, 5, 6 or 7 wherein the saturating agent is a completely polymerizable substance and the additive is an aging protectant.

* * * * *